United States Patent [19]

Decker

[11] Patent Number: 5,100,194
[45] Date of Patent: Mar. 31, 1992

[54] COMBINATION WINDSHIELD-SCREEN DASHBOARD-MAT DEVICE

[76] Inventor: Harry L. Decker, P.O. Box 3673, Page, Ariz. 86040

[21] Appl. No.: 636,708

[22] Filed: Jan. 2, 1991

[51] Int. Cl.⁵ .............................................. B60J 3/00
[52] U.S. Cl. .................................. 296/97.7; 296/97.8; 296/37.12; 160/370.2
[58] Field of Search ................ 296/97.7, 97.8, 97.9, 296/37.12; 160/370.2

[56] References Cited

U.S. PATENT DOCUMENTS

| | | | |
|---|---|---|---|
| 2,207,224 | 7/1940 | Meares | 296/97.7 |
| 2,410,171 | 11/1946 | Le Lande | 296/97 |
| 2,711,923 | 6/1955 | Parks | 296/97 |
| 2,791,272 | 5/1957 | Stehlik | 160/290 |
| 2,813,749 | 11/1957 | Wetig | 296/97 |
| 3,003,812 | 10/1961 | Haugland | 296/97 |
| 3,022,109 | 2/1962 | Hauskama | 296/97 |
| 3,183,033 | 5/1965 | Stulbach | 296/97 |
| 4,105,246 | 8/1978 | Trumbull | 296/97 |
| 4,560,245 | 12/1985 | Sarver | 296/97.7 |
| 4,708,388 | 11/1987 | Zacharczuk | 296/97.7 |

Primary Examiner—Robert R. Song
Attorney, Agent, or Firm—Antonio R. Durando; Harry M. Weiss

[57] ABSTRACT

A three-panel multipurpose device that is installed on the dashboard of a vehicle to form, in its closed position, a protective dashboard mat during the operation of the vehicle. When the vehicle is at rest, two of the panels can be extended by a simple maneuver to cover virtually the entire windshield and protect the interior of the vehicle from sun light damage. When the geometry of the dashboard permits, some of the space between the bottom panel of the apparatus and the top of the dashboard can be utilized to provide additional utility functions or compartments for accessories. The invention is suitable for adaptation to any existing vehicle, including boats and airplanes.

20 Claims, 2 Drawing Sheets

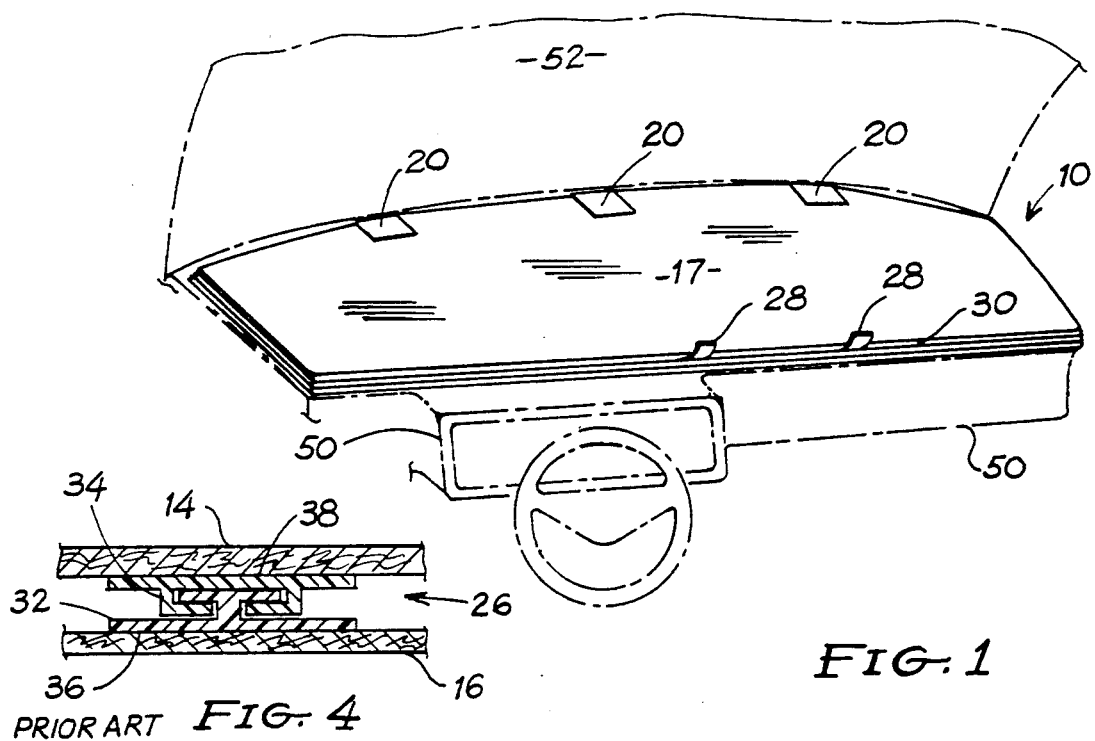
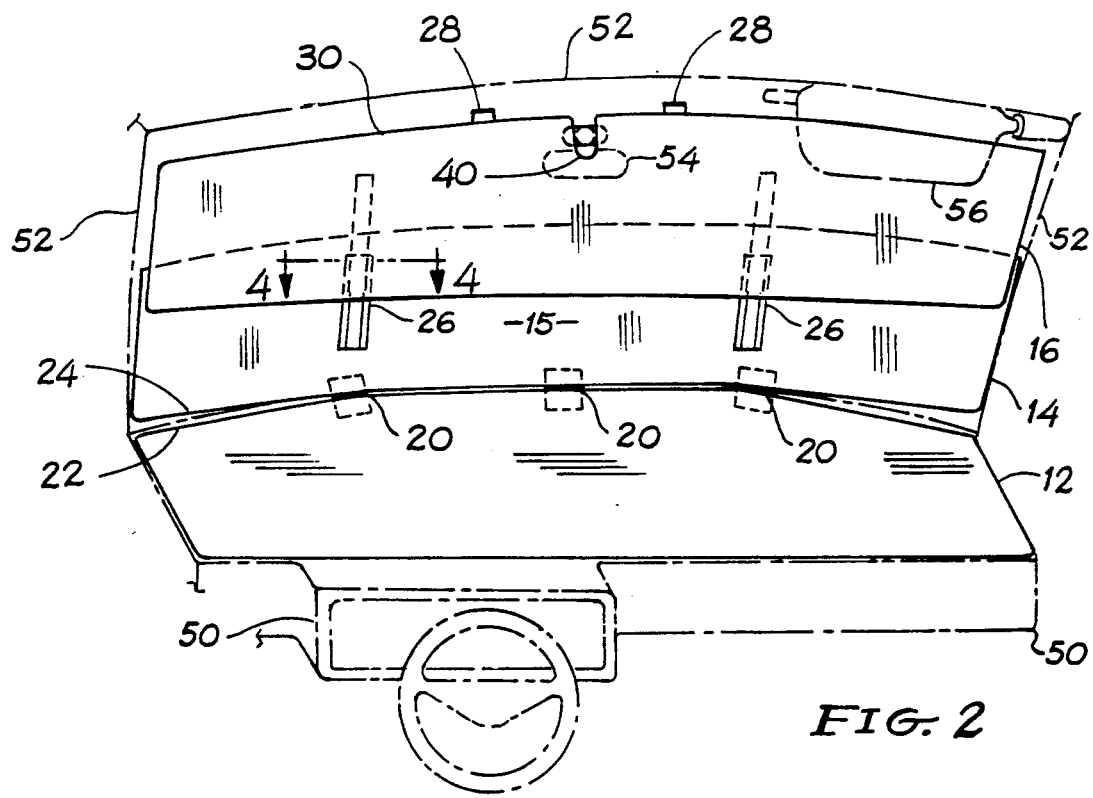

COMBINATION WINDSHIELD-SCREEN DASHBOARD-MAT DEVICE

BACKGROUND OF THE INVENTION

1. Field of the Invention

This invention is related in general to the fields of sun screens and automotive accessories. In particular, the invention provides a motor vehicle dashboard mat that also fulfills the function of windshield screen and a variety of other accessory uses.

2. Description of the Prior Art

People have been trying to protect the interior of their vehicles from scorching sunlight and the discomfort and damage that it may cause ever since carriages have existed. Protection has come in many of forms, ranging from filtering coatings on glass panels to fashionable drapery hanging from the interior of the passenger compartment. More recently, protection has consisted mostly of removable devices placed inside the windshield when the vehicle is at rest, such as the popular accordion-type sun visor frequently seen in parking lots on sunny days.

For example, U.S. Pat. No. 2,410,171 to Le Lande (1946) describes a glare shield mounted on the dashboard of a vehicle to protect the driver from excessive direct sunlight. It consists of a solid piece of anti-glare material only large enough to cover the lower portion of the windshield in front of the driver, so that the view above it remains unobstructed. Hinged at the bottom of the windshield, this device can be flipped up and down, as required by light conditions, but it cannot be extended to cover the entire glass for protection of the vehicle's interior.

U.S. Pat. No. 2,711,923 to Parks (1955) shows an extendable shade that can be mounted on the bottom of a windshield or the top of a dashboard through suction cups attached to its frame. The position of the shade can be adjusted by rotating its frame with respect to the cups to provide the necessary degree of shielding from the sun. In one model, the patent also describes an extension that can be attached to the frame and secured in place by fastening snaps to extend the shield to the top of the glass. This device is intended for protection from light while driving only and, therefore, it is limited to the driver's side of the vehicle.

In U.S. Pat. No. 2,791,272 (1957), Stehlik teaches the construction of an adjustable anti-glare shade that consists of flexible material stored in a roller mounted on the dashboard. The material can be rolled out to the desired length and secured in its extended position by fastening it to two support arms attached to the ends of the roller. Each arm can pivot independently, thus enabling a user to adjust the position of the shade to best screen the light from outside as needed according to variable driving conditions.

U.S. Pat. No. 2,813,749 to Wetig (1957) illustrates another glare shield to protect the driver of a vehicle from direct sun light. It consists of an appropriately sized, rigid screen hinged on a base which is mounted on the dashboard in front of the steering wheel. The screen is normally kept in a flat position. When needed, the driver can raise it by releasing a spring in the unit that pulls the screen to a generally vertical position directly in front of his or her eyes. This device is limited in the scope of coverage and it is not adjustable.

U.S. Pat. No. 3,003,812 to Haugland (1961) describes yet another anti-glare apparatus of pleated construction that collapses into a compact unit in front of the driver and can be extended and adjusted to an optimal position when in use. Each side of the screen is independent for more flexibility. In addition, by the relative adjustment of the two sides, the pleats of the anti-glare material can be positioned to maximize visibility while countering the source of glare. In principle, this invention has the same functional characteristics of the Stehlik patent, but uses a folded screen rather than a rolled one.

In U.S. Pat. No. 3,022,109 (1962), Hauskama discloses a shield specifically designed to protect a driver from the glare received through the rear view mirror of a vehicle. A supporting bracket is mounted on the dashboard and the shield is hinged on it so that it can be positioned to intercept the glare when needed. The scope of the invention is limited to this use and it could not be applied to protect from light in front of the driver.

U.S. Pat. No. 3,183,033 to Stulbach (1965) illustrates another motor vehicle anti-glare shield consisting of a pair of flexible sheets stored in rollers in a cylindrical casing mounted on the dashboard. A shield is formed by extracting either one or both of the sheets from the casing to reach and be fastened to receiving retainers above the windshield. The two anti-glare sheets are pigmented in different colors and with increasing intensity towards the top of the screen, so that the user is afforded a variety of choices.

Finally, U.S. Pat. No. 4,105,246 to Trumbull (1978) discloses a multi-purpose dashboard attachment that can be used to protect from glare as well as to provide a utility unit. It consists of a movable panel hinged on top of a drawer in a single unit for incorporation in the dashboard on the driver's side of the vehicle. By raising the panel toward the windshield, the user can aid the action of the defroster as well as create a shield against glare and heat. At the same time, the drawer provides a means for storing and, when extracted, for supporting small articles. The apparatus does not appear to be suitable for retrofit applications.

These devices are mainly designed to protect a driver from glare while operating a vehicle and their geometries permit only a limited coverage of the windshield area. They also tend to require the use of several pieces of hardware for attachment to the interior of the vehicle, which generally do not conform with the style of the vehicle's interior and detract from its aesthetic value. In addition, these devices generally require the use of two hands to place them in service and sometime require cumbersome adjustments that may affect the safety of their use. Therefore, there still exists a need for a simple and aesthetically attractive device that can be put in service with minimal work to cover the entire windshield area and that can further be adapted for use in combination with accessories for specific utility purposes.

BRIEF SUMMARY OF THE INVENTION

One objective of this invention is the development of a windshield screen that can be put in service with a simple and safe operation.

Another objective of the invention is an apparatus that covers the entire windshield area for maximum protection of the vehicle's interior from sun light.

A further goal of the invention is a device that, when not used as a screen, provides an attractive dashboard mat with the same protective function of similar apparatus currently available as an automotive accessory.

Yet another goal of the invention is a unit that can be adapted to provide additional utility functions depending on the dashboard geometry of the vehicle to which it is attached, such as a compartment for storage or similar applications.

A final objective is the easy and economical manufacture of the case according to the above stated criteria. This is achieved by using commercially available components and materials, modified only to the extent necessary to fit the requirements of the invention.

Therefore, according to these and other objectives, the present invention describes a three-panel multipurpose device that is installed on the dashboard of a vehicle to form, in its closed position, a protective layer during the operation of the vehicle. When the vehicle is at rest, two of the panels can be extended by a simple maneuver to cover virtually the entire windshield and protect the interior of the vehicle from harmful sun light. When the geometry of the dashboard permits, some of the space between the bottom panel of the device and the top of the dashboard can be utilized to provide additional utility functions or compartments for accessories. The invention is suitable for adaptation to any existing vehicle, including boats and airplanes.

Various other purposes and advantages of the invention will become clear from its description in the specifications that follow and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

BRIEF DESCRIPTION OF THE DRAWINGS

FIG. 1 is a perspective view of the windshield-screen dashboard-mat apparatus of this invention, seen from the back in its closed position as mounted on the dashboard of a vehicle.

FIG. 2 is prospective view of the same apparatus of FIG. 1 after it has been opened to form a protective screen over the vehicle's windshield.

FIG. 4 is a detailed cross-sectional view of the T-channel system used to provide slidable support for the panel extending to form a windshield screen, taken from line 4—4 in FIG. 2.

DETAILED DESCRIPTION OF THE INVENTION

Figure 3:
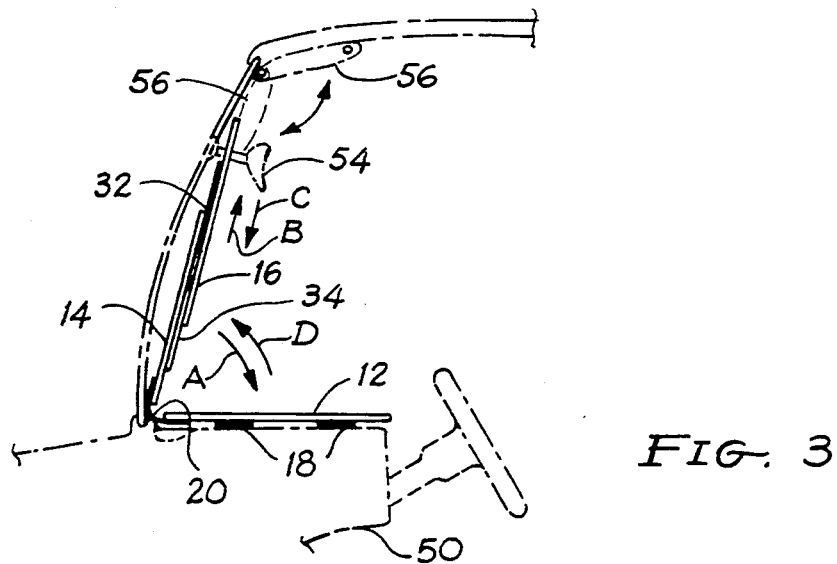
FIG. 3 is lateral view of the same apparatus of FIG. 1 showing its functioning as it extends to form a windshield screen.

This invention consists of the application of simple mechanical principles in combination with known structural components to achieve a practical and economical design for an improved windshield screen. The main point of the invention lies in the recognition of the fact that the structure of an extendable multi-panel screen can also be used to provide a protective dashboard mat and, if desired, to create utility compartments out of otherwise unused spaces. Thus, the screen of this invention is generally shaped like a dashboard and is hinged to it near the bottom edge of the windshield. It consists of three or more similarly shaped sections that rest on top of each other on the dashboard. In order to cover the windshield, the device is pulled upward by pivoting around the hinges and the various sections are extended outwardly by sliding them over fixed tracks so as to cover most of the windshield. As in the case of fold-up type of screens, this screen is then left to rest against the rear view mirror or the sun visors. The invention is suitable for installment either as a factory option or as an accessory for after-market retrofitting.

Referring now to the drawings, wherein like parts are designated throughout with like numerals and symbols, FIG. 1 illustrates in perspective view the windshield-screen 10 of this invention as it appears mounted on a vehicle's dashboard 50 in its mat configuration before it is folded open. Very similar in size and exterior appearance to a standard dashboard mat, the apparatus of this invention consists of at least three rigid panels, seen in extended position as 12, 14 and 16 in FIG. 2, which lie stacked on top of each other when the device is in its closed position and form a single top surface 17. The bottom panel 12 in the stack is shaped to conform to the top geometry of the vehicle's dashboard and it is attached to it by fastening means 18 (shown in FIG. 3), such as fiber-loop components (Velcro ® strips) cooperatively placed on the panel and the dashboard, adhesive tape or other equivalent devices. The top panel 14 is shaped like the bottom panel 12 and it is pivotally fastened to it by a multiplicity of hinges 20 connecting the front edges 24 and 22 of both panels, respectively. The intermediate panel 16 is slideably attached to the bottom surface 15 of the top panel 14 so that it can extend outward when the three panels are not stacked together. A typical attachment consists of pairs of tracks 26 affixed to each panel in slidable cooperation with each other, allowing the intermediate panel to freely slide in and out of its sandwiched position by simply pulling on apposite tabs 28 affixed to its back edge 30.

FIG. 4 shows the cross-section of the track system used in the preferred embodiment of the invention. As is well understood in the art, the system comprises a female T-channel 34 that is attached, as by the use of adhesives on its back surface 38, to the bottom surface 15 of the top panel 14 to provide a stationary frame for the sliding motion of the intermediate panel 16. A corresponding male T-post 32 is designed to fit snugly (as shown in FIG. 4) and slide inside the T-channel with the application of slight force. By attaching the back surface 36 of the T-post to the top surface of the intermediate panel 16 (shown by dotted lines in FIG. 2), a sturdy assembly is created for the repeated extension and contraction of the unit to alternatively form a windshield screen or a dashboard mat. In its extended position, the panel 16 reaches its maximum height to cover most of the vehicle's windshield 52 and provide maximum protection from sun light. A special opening 40 is provided in the back edge of the intermediate panel 16 to accommodate the post of the rear-view mirror 54 typically protruding inward from the upper portion of the windshield. The combination of panels 14 and 16 is kept from folding to a closed position by the mirror 54 or by the use of one or both sun visors 56 turned down to overlap the upper edge of the screen. Finally, the extended panel 16 is prevented from collapsing into its retracted position by the friction in the track system 26, which must be sufficiently tight to require some force to cause the relative sliding of its components.

In use, the apparatus described above normally rests in the position illustrated in FIG. 1, firmly attached to the vehicle's dashboard by appropriate fastening devices. The top surface 17 can be utilized for any of the normal applications for which dashboard tops are employed. It may be covered with plush-looking fiber or with anti-glare material. In view of the fact that it becomes visible from the outside when the screen is up, the top surface can be used as well for carrying advertising or other messages for publication. It could even be used to house photovoltaic cells connected to the vehicle's battery in order to maintain its charge during prolonged idle periods. When the vehicle is parked, the apparatus of the invention can be transformed quickly and easily into a windshield screen by pulling up on one of the tabs 28, so as to cause the top panel 14 to swing open in an upward direction, as indicated by arrow A in FIG. 3. Then the tab is pulled to extend the intermediate panel 16 with a generally vertical motion, as indicated by arrow B in FIG. 3, to cover as much as possible of the interior of the windshield. As mentioned above, the resulting screen is then kept open either by the presence of a rear-view mirror or by the use of the sun visors. The opposite steps, indicated by arrows C and D in FIG. 3, are followed in order to retract the screen and return the assembly to its dashboard mat configuration.

Figure 5:
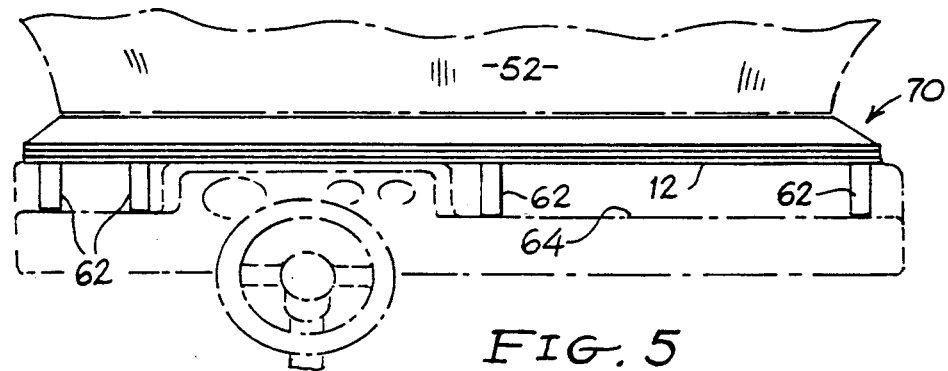
FIG. 5 is an illustration of another embodiment of the invention that includes accessory compartments under the stationary bottom panel.

FIG. 5 illustrates another embodiment 70 of this invention incorporating accessory features that can be implemented when the vehicle's dashboard is not uniformly flat. The voids covered by the installation of the screen form receptacles that can be utilized for a variety of applications. Since appropriate spacers 62 need to be employed to level the position of the screen in the process of installation, they provide a natural framework for the addition of utility accessories in the space between the bottom panel 12 and the top surface 64 of the dashboard 60 (seen in FIG. 5 only). Thus, electrical appliances such as CB radios, tape recorders, CD players and similar devices, for which there may not otherwise be room in the dashboard, may be installed in this space. Similarly, the space, whether fully enclosed or not, can be used for additional storage or to house special retractable accessories, such as mirrors and map holders.

Figure 6:
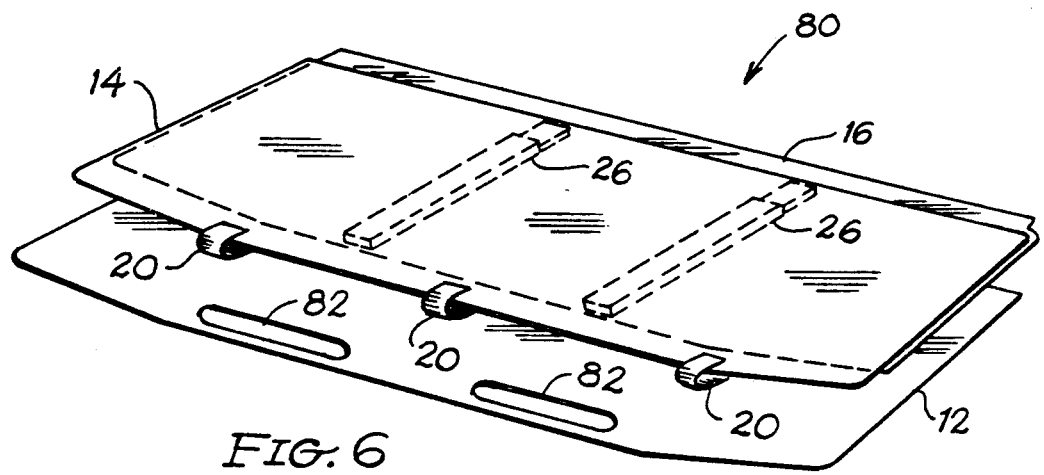
FIG. 6 is still another illustration of the invention including air passages for defroster vents.

While the embodiments shown in the figures feature the specific shapes therein described, the invention can obviously take other shapes with equivalent functionality and utility. In fact, any shapes for the various panels that retain the functional characteristics described above provide an acceptable apparatus to practice the invention. For instance, FIG. 6 shows a perspective frontal view of one embodiment 80 of the invention (not mounted) where the bottom panel 12 features vent openings 82 for the free passage of defroster air to the windshield. Since the hinges 20 are positioned backwards with respect to the configurations illustrated above, this embodiment is particularly appropriate for deep dashboards. Although not illustrated in the drawings, another embodiment of the invention could feature half-moon indentations in the back edge of the bottom panel 12 to provide a space where the tabs 28 are normally kept hidden and can easily be reached to open the device.

The number of panels and the hardware provided to open and close them can be varied in obvious ways without affecting the scope of this disclosure. For example, additional side panels could be incorporated for airplane use in order to also provide screens for the lateral windshields commonly found in cockpits. These panels could be mounted on hinges or on horizontal tracks attached to the bottom side of each extendable panel, so that they could be extended outwardly when the apparatus is in its open position. Similarly, a variety of compartments and accessories can be added by one skilled in the art to fit the particular characteristics of specific dashboards. For instance, the bottom panel could become an integral part of the dashboard, as manufactured at the factory, and the entire multi-panel assembly could assume a split-level geometry to conform to the contour of the dashboard.

The windshield screen of this invention is sized to fold into a unit approximating the area of the top surface of the dashboard in the vehicle for which it is used, but the same functional principles can be applied to units of different dimensions, so long as practical for the vehicle at hand. It has been found that reinforced cardboard covered with paper, vinyl and fabric, of the type normally used in the construction of dashboard mats, is particularly suitable for the manufacture of the various structural components of the invention because of its strength and relatively low cost. Common hardware is used to assemble them. Thin layers of wood can also be used, particularly to create the supporting bottom panel for uneven dashboards. Nevertheless, any durable material would be equivalently adequate and acceptable to practice the invention.

It is also anticipated that this invention, as herein disclosed, can be used in equivalent fashion to provide a windshield-screen backdash-mat device to protect the back window area of motor vehicles. Of course, the device would then be adapted to cover the vehicle's backdash and back windshield instead of the dashboard and front windshield, as described in detail here, but the same functional relationship of the various components would apply in a way that would be obvious to one skilled in the art.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims, so as to embrace any and all equivalent apparatus and methods.

What I claim as my invention is:

1. A combination windshield-screen dashboard-mat device for protecting the interior of a vehicle from damage caused by sun light exposure, comprising:
   (a) a bottom panel shaped to conform to the top geometry of the vehicle's dashboard;
   (b) means for fastening said bottom panel to said dashboard;
   (c) a top panel shaped substantially like said bottom panel and pivotally fastened to it at a multiplicity of points along the front edge of each of said panels, said top panel having a closed position wherein it rests substantially horizontally on top of said bottom panel and having an open position wherein it rests substantially vertically against the windshield of the vehicle; and (d) at least one intermediate panel sandwiched between said bottom panel and said top panel in its closed position and slideably attached to the bottom surface of said top panel, so that it can extend outward and upward when said top panel is pivoted in its open position, wherein the back edge of the uppermost of said at least one intermediate panel features an opening to accommodate the post of the rear-view mirror typically protruding inward from the upper portion of said windshield.

2. The device described in claim 1, wherein said at least one intermediate panel is slideably attached to the bottom surface of said top panel by means of pairs of tracks affixed to each panel in slidable cooperation with each other, allowing said at least one intermediate panel to freely slide in an out of its sandwiched position by pulling in the desired direction.

3. The device described in claim 2, wherein said means for fastening said bottom panel to said dashboard consists of fiber-loop fastening components cooperatively placed on said bottom panel and dashboard.

4. The device described in claim 3, wherein said top panel is pivotally fastened to said bottom panel at a multiplicity of points by a corresponding multiplicity of hinges connecting the front edge of each of said panels.

5. The device described in claim 4, further comprising at least one tab affixed to the back edge of said at least one intermediate panel for use in pulling it open from its sandwiched position.

6. The device described in claim 5, wherein said tracks affixed to each panel in slidable cooperation with each other consist of T-channel and T-post pairs.

7. The device described in claim 6, wherein the front portion of said bottom panel contains defroster vent openings.

8. The device described in claim 7, further comprising utility compartments in the space formed between said bottom panel and the top surface of said dashboard as a result of the installation of said device when said dashboard is not uniformly flat, said utility compartments providing space for incorporating accessory features.

9. The device described in claim 8, further comprising side panels mounted on horizontal tracks attached to the bottom side of each of said at least one intermediate panel, so that they can be extended outwardly to cover lateral windshields when said top panel is in its open position.

10. The device described in claim 9, wherein the top surface of said top panel is covered with dashboard mat material.

11. The device described in claim 9, wherein the top surface of said top panel is covered with anti-glare material.

12. A method for protecting the interior of a vehicle from damage caused by sun light exposure, comprising the following steps:

(a) providing a bottom panel shaped to conform to the top geometry of the vehicle's dashboard;

(b) providing means for fastening said bottom panel to said dashboard;

(c) providing a top panel shaped substantially like said bottom panel and pivotally fastened to it at a multiplicity of points along the front edge of each of said panels, said top panel having a closed position wherein it rests substantially horizontally on top of said bottom panel and having an open position wherein it rests substantially vertically against the windshield of the vehicle;

(d) providing at least one intermediate panel sandwiched between said bottom panel and said top panel in its closed position and slideably attached to the bottom surface of said top panel, so that it can extend outward and upward when said top panel is pivoted in its open position, wherein the back edge of the uppermost of said at least one intermediate panel features an opening to accommodate the post of the rear-view mirror typically protruding inward from the upper portion of said windshield and features at least one tab for use in pulling it open from its sandwiched position; and (e) pulling on said at least one tab to pivot said top panel into a substantially vertical position and to extend said at least one intermediate panel to cover said windshield and to slide above said rear-view mirror post.

13. The method described in claim 1, wherein said at least one intermediate panel is slideably attached to the bottom surface of said top panel by means of pairs of tracks affixed to each panel in slidable cooperation with each other, allowing said at least one intermediate panel to freely slide in an out of its sandwiched position by pulling in the desired direction.

14. The method described in claim 13, wherein said means for fastening said bottom panel to said dashboard consists of fiber-loop fastening components cooperatively placed on said bottom panel and dashboard.

15. The method described in claim 14, wherein said top panel is pivotally fastened to said bottom panel at a multiplicity of points by a corresponding multiplicity of hinges connecting the front edge of each of said panels.

16. The method described in claim 15, wherein said tracks affixed to each panel in slidable cooperation with each other consist of T-channel and T-post pairs.

17. The method described in claim 16, wherein the front portion of said bottom panel contains defroster vent openings.

18. The method described in claim 17, further comprising the step of providing utility compartments in the space formed between said bottom panel and the top surface of said dashboard as a result of the installation of said method when said dashboard is not uniformly flat, said utility compartments providing space for incorporating accessory features.

19. The method described in claim 18, further comprising the step of providing side panels mounted on horizontal tracks attached to the bottom side of each of said at least one intermediate panel, so that they can be extended outwardly to cover lateral windshields when said top panel is in its open position.

20. The method described in claim 19, wherein the top surface of said top panel is covered with dashboard mat material.

* * * * *